United States Patent
Coen et al.

(10) Patent No.: US 10,098,283 B2
(45) Date of Patent: Oct. 16, 2018

(54) BALING CHAMBER SENSOR

(71) Applicant: CNH Industrial America LLC, New Holland, PA (US)

(72) Inventors: Tom Coen, Zemst (BE); Didier Verhaeghe, Ieper (BE); Robrecht M. K. Dumarey, Gistel (BE)

(73) Assignee: CNH Industrial America LLC, New Holland, PA (US)

(*) Notice: Subject to any disclaimer, the term of this patent is extended or adjusted under 35 U.S.C. 154(b) by 427 days.

(21) Appl. No.: 14/767,946

(22) PCT Filed: Feb. 13, 2014

(86) PCT No.: PCT/EP2014/052828
§ 371 (c)(1),
(2) Date: Aug. 14, 2015

(87) PCT Pub. No.: WO2014/125029
PCT Pub. Date: Aug. 21, 2014

(65) Prior Publication Data
US 2015/0373918 A1 Dec. 31, 2015

(30) Foreign Application Priority Data
Feb. 15, 2013 (BE) .................. 2013/0103

(51) Int. Cl.
*A01F 15/04* (2006.01)
*A01F 15/08* (2006.01)
*A01F 15/14* (2006.01)

(52) U.S. Cl.
CPC ............ *A01F 15/08* (2013.01); *A01F 15/044* (2013.01); *A01F 15/0825* (2013.01);
(Continued)

(58) Field of Classification Search
CPC ...... A01F 15/044; A01F 15/08; A01F 15/145; A01F 15/0825; A01F 15/0841;
(Continued)

(56) References Cited

U.S. PATENT DOCUMENTS 4,711,078 A * 12/1987 Schaible .............. A01D 85/002
100/4
5,783,816 A 7/1998 McPherson
(Continued)

FOREIGN PATENT DOCUMENTS

AU 2010101429 A4 2/2011
CN 2540087 Y 3/2003
(Continued)

*Primary Examiner* — Jimmy T Nguyen
(74) *Attorney, Agent, or Firm* — Patrick M. Sheldrake; Peter K. Zacharias

(57) ABSTRACT

An agricultural baler having a baling chamber and a pre-compression chamber, wherein the pre-compression chamber is adapted to periodically form a slice of crop material and push the slice towards the baling chamber into a first segment of the baling chamber, the baling chamber has a plunger provided for reciprocally moving in the baling chamber thereby compressing slices of crop material into a bale, wherein at least one optical bale length sensor is provided in the baling chamber for measuring the length of the bale.

8 Claims, 2 Drawing Sheets

(52) U.S. Cl.
CPC ........ *A01F 15/0858* (2013.01); *A01F 15/145* (2013.01); *A01F 2015/0866* (2013.01)

(58) Field of Classification Search
CPC ............ A01F 15/0858; A01F 2015/102; A01F 2015/0866; G01B 21/06
USPC ............................ 100/179, 245; 56/341, 443
See application file for complete search history.

(56) References Cited

U.S. PATENT DOCUMENTS

| | | | |
|---|---|---|---|
| 5,855,166 | A | 1/1999 | McPherson |
| 6,421,990 | B1 | 7/2002 | Ohlemeyer et al. |
| 6,708,478 | B1 | 3/2004 | Mesmer et al. |
| 8,770,102 | B2 | 7/2014 | Verhaeghe et al. |
| 2004/0187468 | A1* | 9/2004 | Krone ................. A01F 15/0825 56/341 |
| 2004/0221747 | A1* | 11/2004 | Dubois ............... A01F 15/0825 100/4 |
| 2006/0027750 | A1 | 2/2006 | Kormann et al. |
| 2006/0048654 | A1 | 3/2006 | Biziorek |
| 2006/0191251 | A1 | 8/2006 | Pirro et al. |
| 2007/0130900 | A1 | 6/2007 | Kormann et al. |
| 2007/0175198 | A1 | 8/2007 | Viaud et al. |
| 2008/0148703 | A1 | 6/2008 | Smith et al. |
| 2008/0186487 | A1 | 8/2008 | Kormann et al. |
| 2009/0235628 | A1 | 9/2009 | Derstine et al. |
| 2010/0288140 | A1 | 11/2010 | Smith et al. |
| 2010/0315653 | A1 | 12/2010 | Weingartz et al. |
| 2011/0001985 | A1 | 1/2011 | Igaki |
| 2012/0000377 | A1 | 1/2012 | Verhaeghe O.M. et al. |
| 2013/0312381 | A1* | 11/2013 | Lang ................... A01F 15/0825 56/14.7 |

FOREIGN PATENT DOCUMENTS

| | | |
|---|---|---|
| DE | 4036211 A1 | 5/1992 |
| FR | 2754138 A1 | 4/1998 |
| SU | 1011076 A1 | 4/1983 |
| WO | 2011020754 A1 | 2/2011 |

* cited by examiner

BALING CHAMBER SENSOR

This application is the US National Stage filing of International Application Serial No. PCT/EP2014/052828 filed on Feb. 13, 2014 which claims priority to Belgian Application BE2013/0103 filed Feb. 15, 2013, each of which is incorporated herein by reference in its entirety.

FIELD OF THE INVENTION

The present invention relates to an agricultural baler. Preferably the present invention relates to a square agricultural baler, which is provided for gathering crop material, forming slices of crop material from the gathered crop material, and pressing square bales from the slices.

BACKGROUND OF THE INVENTION

Agricultural balers typically comprise two main parts used in the formation of the bales, being a pre-compression chamber and a baling chamber. Crop material is gathered and pushed into the pre-compression chamber, where a slice of crop material is formed. Pre-compression chamber is linked to the baling chamber in such a manner that the slice of crop material can periodically be transferred into the baling chamber. In the baling chamber, a plunger reciprocally moves, thereby pressing a square bale from subsequently feeded slices.

The plunger movement is powered via a main shaft driven by a motor. Thereby, the motor can be a part of the baler, or can be a part of the puller (tractor) connected to the baler via a power take-off (PTO).

The pre-compression chamber is adapted for receiving gathered crop material. To this end, the pre-compression chamber shows an inlet. The pre-compression chamber furthermore shows an outlet towards the baling chamber. Between the inlet and the outlet, a channel is defined in which crop material can gather into a slice of crop material. The pre-compression chamber comprises a slice pushing mechanism provided for pushing a slice of crop material formed in the pre-compression chamber through the outlet of the pre-compression chamber into the baling chamber. Thereby the slice of crop material is pushed in the baling chamber, after which the plunger can propel the crop material into the baling chamber, thereby pushing the most recently entered slice into the baling chamber, making it a part of the square bale.

The pre-compression chamber comprises, for the purpose of pushing the slice into the baling chamber, a slice pushing mechanism. Different types of slice pushing mechanisms are known, among which fingers grasping behind the slice and pushing the slice through the outlet, or a set of conveyer belts in between which the slice is formed, and which conveyer belts are driven to push the slice through the outlet.

Synchronization of plunger movement and slice pushing movement is typically realized by mechanically linking the plunger driving mechanism and the slice pushing driving mechanism. Such mechanical link ensures proper synchronization, as the slice pushing mechanism is mechanically driven by the plunger movement, it cannot move out of synchronization.

A drawback of the known agricultural balers is that mechanisms to determine the length of the bales are complex and unreliable.

U.S. Pat. No. 5,783,816 shows a bale measuring apparatus using measuring wheels for measuring the strings used by the baler to wrap the bale. The measuring wheel includes a plurality of teeth and is used with an optical beam generator and optical beam detector. The string is wrapped around the wheel and turns the wheel when it is pulled by the moving bale. The device of U.S. Pat. No. 6,708,478 regulates the bale length by using sensors which detect the forward and backward movement of a measuring wheel by the crop material inside the baling chamber. Also, AU 2010101429 discloses the use of e.g. an optical sensor attached to a circular disc or wheel which contacts the bale.

The disadvantage of these solutions is that an indirect measurement is used to determine the actual movement of the bale. Since balers operate on extreme conditions (high and cold temperatures, high pressures, . . . ), indirect measurements may be inaccurate and unreliable.

To this end the invention provided in an agricultural baler comprising a baling chamber and a pre-compression chamber, wherein the pre-compression chamber is adapted to gather crop material and to periodically form a slice of said crop material and push the slice towards the baling chamber into a first segment of the baling chamber, the baling chamber comprising a plunger provided for reciprocally moving in the baling chamber thereby compressing slices of crop material into a bale, wherein at least one optical bale length sensor is provided directly adjacent the crop material in the baling chamber for measuring the length of the passing-by bale by detecting the surface of the crop material in the baling chamber.

SUMMARY OF THE INVENTION

An optical sensor is simple to integrate in a baling chamber and proves to be reliable in measuring the length of the bale in the baling chamber. An optical sensor proved to show only a negligible deviation particularly when measuring lengths of rough surfaces that is typical for a bale. Subsequent measurements are used to determine the distance between the changes of the surfaces on the subsequent measurements to determine the actual traveled distance of the crop material in the baling chamber. Therefore an optical sensor provides a reliable output and the length of the bale can be correctly determined. Furthermore, an optical sensor is typically provided to operate without physical contact with the object to be measured. As balers operate under extreme conditions (high and cold temperatures, high pressures, . . . ), the absence of physical contact proves to enhance the reliability of the measuring system.

Preferably the at least one optical bale length sensor is located in a plane that is perpendicular to an inner baling chamber wall plane and at a distance from said inner baling chamber wall plane. Optical sensor are suitable for measuring the length of a passing-by object, for example based on time of flight or based on the Doppler principle. By placing the optical sensor directly adjacent the passing-by bale, the length of the bale can be measured with high accuracy.

Preferably the optical bale length sensor is a laser sensor. Laser sensors prove to be less susceptible to dust. Dust is often omnipresent in a baling chamber, which dust can obstruct the visibility in the baling chamber. Since optical sensor measurement is based on the vision, visibility should be acceptable. Tests have proven that a laser sensor is less vulnerable to dust, and that results maintain good even in dusty environments. Thereby, the sensor preferably applies the laser Doppler velocimetry technique. This technique allows to measure with high accuracy the length of a passing object, in this case the bale. This technique is also suitable for being applied to measure rough surfaces.

Alternatively, the optical bale length sensor is a camera which takes successive images from the bale. These successive images are then compared to each other to determine the moving distance of the bale over the time period between the compared images.

Preferably a knotter system is provided at the baling chamber, the knotter system being provided for wrapping at least one twine loop lengthwise around the bale, wherein another of the at least one optical bale length sensor is located at a twine to measure the length of the bale via measuring the length of the twine. When the bale exits the baling chamber, the crop material tends to expand due to the resilience of the crop material. The twine loop around the bale limits the expansion. By measuring the length of the twine via a sensor, the exact length of the bale after the bale has exit the baling chamber and after the crop material has expanded can be determined. This length can significantly deviate from the length of the bale inside the baling chamber, due to the expansion. By measuring the twine length, the length of the bale as end-product can be determined with high accuracy.

By providing both a sensor for measuring the twine length and a sensor for measuring the bale length directly, allows to determine the deviation between the bale length in the baling chamber and the definitive bale length. Based on this knowledge, the baling process can be further steered and optimized.

Preferably said another of the at least one optical bale length sensor comprises a sensor for each twine loop arranged to measure the length of the respective twine. In practice, multiple twine loops are provided around one bale. These loops are provided at different transverse positions. By measuring the length of each twine, transverse bale length deviation can be determined. Thereby, the overall definitive bale shape is known. A strong deviation in length of different twines on a bale indicates a malformed bale. This information can be used to steer the baling process.

Preferably, the at least one optical bale length sensor is rigidly mounted to the baling chamber frame. Thereby simple and cheap optical sensors can be mounted at strategic places in the baling chamber. This provides a cheap, simple and reliable manner for measuring bale lengths.

BRIEF DESCRIPTION OF THE DRAWINGS

The invention will now be described in more details with respect to the drawings illustrating some preferred embodiments of the invention. In the drawings.

In the drawings a same reference number has been allocated to a same or analogous element.

DETAILED DESCRIPTION OF EMBODIMENT(S)

Figure 1:
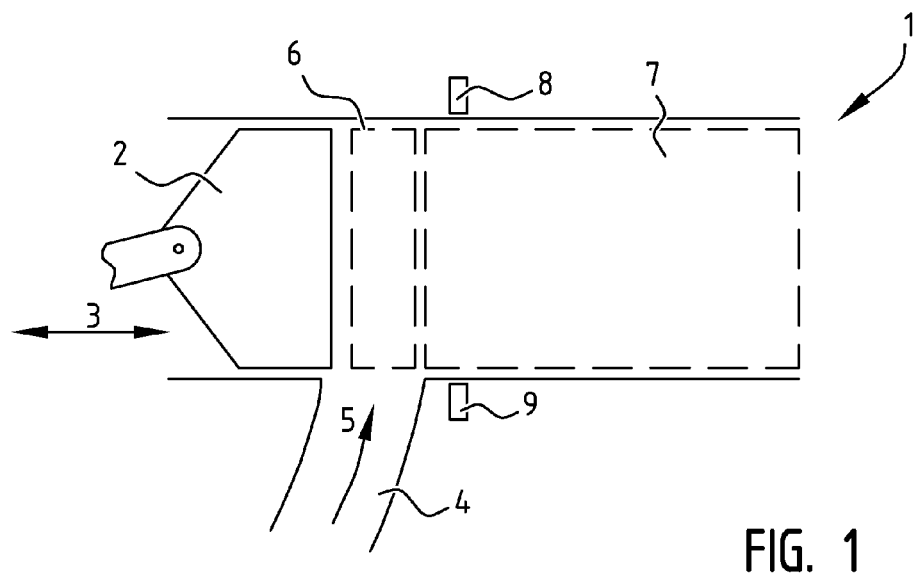
FIG. 1 shows a schematical side-view representation of a first example of a baling chamber in cross section.

FIG. 1 shows a baling chamber 1 for a square agricultural baler. The baling chamber comprises a plunger 2 that is provided to reciprocally move 3 thereby forming a bale and pushing the bale towards the back end of the baling chamber. The baling chamber comprises an entrance to which a pre-compression chamber 4 is connected, so that slices of crop material can be formed in the pre-compression chamber and pushed 5 into the baling chamber. The first segment of the baling chamber is provided to receive the slice of crop material 6. The plunger reciprocally moving in the baling chamber pushes the slice of crop material 6 into the baling chamber, thereby forming a square bale 7. The baling chamber is further provided with optical bale length sensors 8, 9.

The optical bale length sensor is mounted to the baling chamber wall or to the frame of the baler in such a manner that it is directly adjacent to the crop material in the baling chamber, when the baling chamber is in operation. The optical baling sensor is a sensor that does not require contact with the crop material to perform the measurement. Contact sensors such as starwheel sensors puncture the bale and therefore the measurement is dependent on the density of the bale, which drawback can be overcome with an optical sensor. To this end, the sensor comprising the optical measurement means is located in a plane that is perpendicular to the inner baling chamber wall plane and at a distance from said plane. Thereby, the distance between the sensor plane and the baling chamber wall plane depends on the characteristics of the sensor. Thus, the optical sensor looks directly at the crop material which is moving inside the baling chamber to monitor and determine the actual movement of the crop inside the baling chamber. None contacting optical measurement sensors typically have specifications that indicate the distance between the object to be measured and the optical surface of the sensor. Furthermore the expansion of the crop material through the opening in which the optical sensor is placed, influences the distance. Typically, the distance between the optical surface of a sensor and the inner baling chamber wall plane is between 1 and 5 cm, more preferably around 3 cm. The optical sensor will detect a specific surface of crop material of the bale in the baling chamber at the location of the optical sensor. When the bale is being pushed further into the direction of the back end of the baling chamber, the optical sensor will detect a number of specific surfaces of the crop material. When comparing these successive inputs, the actual distance which the material has moved inside the baling chamber can be calculated.

Alternatively the optical sensor is a camera which takes successive images from the bale. These successive images can be compared to each other to determine the moving distance of the bale over the time period between the compared images. From this information, the bale speed can be determined.

FIG. 1 shows two sensors. First optical bale length sensor 8 is provided at a top surface of the baling chamber. The second optical bale length sensor 9 is located at a bottom surface of the baling chamber. Further optical sensors can be provided at the side wall of the baling chamber. Also the location of the optical sensor in the longitudinal direction of the baler can be amended. For example, an optical sensor can be provided close to the open end of the baling chamber.

Figure 2:
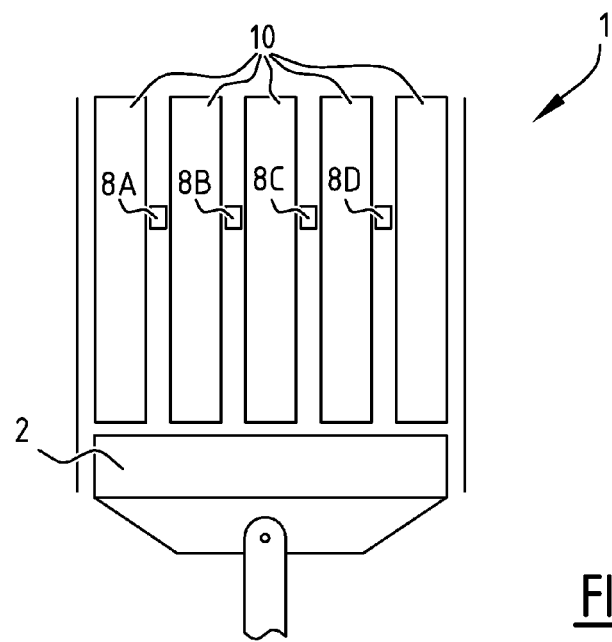
FIG. 2 shows a schematical top-view of a second example of a baling chamber.

FIG. 2 shows a top view of a baling chamber 1. The FIG. 2 shows the plunger 2 and shows how the top wall of the baling chamber 1 is formed by multiple longitudinally extending beams. According to the example given in FIG. 2, five beams 10 are provided. In the openings between adjacent beams, optical bale length sensors can be mounted. In FIG. 2, four sensors 8A, 8B, 8C and 8D are mounted. The advantage of mounting the optical bale length sensors between adjacent beams, is that the position of the sensors in the upward direction and in the longitudinal direction can be freely chosen. Thereby, an optimal location can be found for the sensors. Furthermore, having multiple sensors arranged over the width over the baling chamber provides the advantage that bale deviations can be noticed at an early stage in the formation process of the bale. For example, when more crop material is present at the left hand side of the baling chamber than on the right hand side, the bale will have a higher density at the left hand side of the baling chamber. As a result, the length of the bale on the left hand side of the baling chamber will eventually be longer than the length of the bale on the right hand side, thereby ending up with a curved bale. For example, such deviation can be recognized by measuring a different in length between sensor 8*a* and 8*d*.

Figure 3:
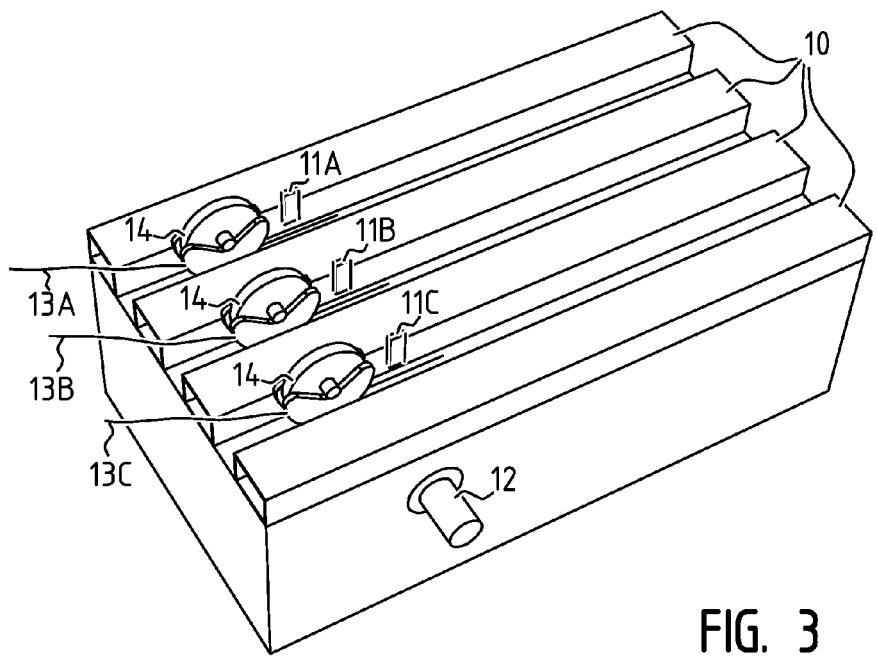
FIG. 3 shows a schematical perspective view of a third example of a baling chamber.

FIG. 3 shows a further example of a baling chamber 1. In the example of FIG. 3, the top wall of the baling chamber is formed by four beams 10. In between these four beams 10, knotter systems are provided. For clarity purposes, the knotter systems are only partly shown in FIG. 3. Thereby, the part that are irrelevant for the present invention are not shown. The knotter systems are provided to wrap a twine loop lengthwise around the bale that is formed in the baling chamber. To this end, each knotter system comprises a twine feeding mechanism. In FIG. 3, three twine feeding mechanisms are shown each comprising a twine 13A, 13B, 13C and a twine positioning guide 14. Optical bale length sensors 11A, 11B, 11C are provided at each twine 13A, 13B, 13C respectively to measure the length of the bale via measuring the length of the twine. The advantage of using an optical length sensor for measuring the length of the twine with respect to other length sensors, is that an optical sensor is not or at least less sensitive to overshoot. In a baling chamber in operation, the twines are not always moved in a smooth manner. The optical length sensor is capable of measuring correctly even when the twine moves with high acceleration peaks (moving with shocks).

The advantage of measuring the bale length via measuring the twine length, is that the twine length will determine the final length of the bale when the bale has exit the baling chamber. Namely, the resilience of the crop material will tend the bale to expand after it has left the baling chamber. The twine loops prevent further expansion of the bale after a point where the twine is fully extended. By measuring multiple twine lengths over the width of the bale, a deviation in bale shape can be detected early in the formation process of the bale. FIG. 3 furthermore shows an optical sensor 12 located at the side wall of the baling chamber.

Figure 4:
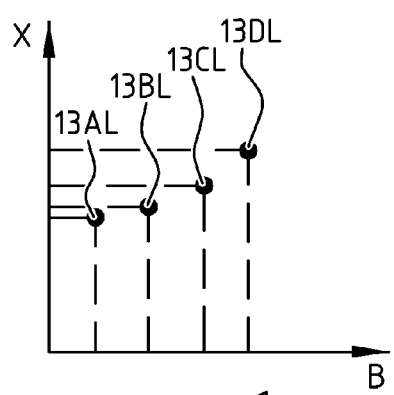
FIG. 4 shows a deviation in bale shape in relation with the measured twine length.
Figure 4:
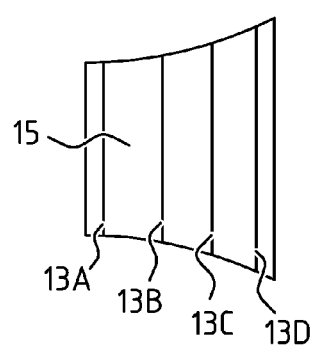

FIG. 4 shows a bale 15 having a curved outer shape, whereby the right hand side of the bale is longer than the left hand side of the bale. The FIG. 4 shows a corresponding graph whereby on the horizontal axis the width B of the bale is indicated and on the vertical axis the measured length X of each twine is shown. Thereby, four twine lengths are measured being 13AL, 13BL, 13CL and 13DL. The graph shows how the measured length increases from the left hand side to the right hand side. This measurement is done in the baling chamber by the optical bale length sensors as is shown in the previous figures. The result of the length deviation is a curved bale 15. Because the length of the twine loops 13A, 13B, 13C and 13D increase from left to right, consequently the length of the bale increases from left to right thereby resulting in a curved bale. By detecting a deviation of the bale length via the optical bale length sensors, an operator of the baler can intervene and correct the baler settings in order to counter the deviation.

Preferably a combination of optical bale length sensors are provided whereby some of the sensors are provided to measure twine lengths while others are arranged to directly measure the bale length. Based on these measurements, control parameters can be adjusted by an operator.

Preferably, the optical bale length sensor is a laser sensor. Lasers are known to cope well with dusty environments. The laser sensors preferably implements the laser Doppler velocimetry technique, which is the technique of using the Doppler shift in a laser beam to measure the linear or vibratory motion of a surface. Such laser centers are known as reliable and accurate in industrial environments.

The invention claimed is:

1. An agricultural baler comprising:
a baling chamber and a pre-compression chamber, wherein the pre-compression chamber is configured to push crop material towards a first segment of the baling chamber, the baling chamber comprising a plunger for reciprocally moving in the baling chamber thereby compressing crop material into a bale,
wherein at least one optical bale length sensor is directly adjacent to the crop material in the baling chamber and configured for measuring a length of a passing bale by directly detecting a surface of the crop material in the baling chamber, and
wherein the at least one optical bale length sensor is located in a plane that is perpendicular to an inner baling chamber wall plane of the baling chamber and at a distance from said inner baling chamber wall plane.

2. The agricultural baler according to claim 1, wherein the optical bale length sensor is a laser sensor.

3. Agricultural baler according to claim 2, wherein the sensor applies a laser Doppler velocimetry technique to measure a linear motion or a vibratory motion vibratory motion of the surface of the bale.

4. The agricultural baler according to claim 1, wherein the optical bale length sensor is a camera which takes successive images of the crop material forming the bale.

5. The agricultural baler according to claim 4, wherein the successive images are compared to each other to determine the moving distance of the bale over the time period between the compared images.

6. The agricultural baler according to claim 1, wherein a knotter system is provided at the baling chamber which is provided for wrapping at least one twine loop lengthwise around the bale, wherein another optical bale length sensor is located at a twine to measure the length of the bale via measuring the length of the twine.

7. The agricultural baler according to claim 6, wherein said another optical bale length sensor comprises a sensor for each twine loop arranged to measure the length of the respective twine.

8. The agricultural baler according to claim 1, wherein the at least one optical bale length sensor is rigidly mounted to a baling chamber frame.

* * * * *